United States Patent
Jang

(10) Patent No.: US 10,331,575 B2
(45) Date of Patent: Jun. 25, 2019

(54) SECURED CHIP ENABLE WITH CHIP DISABLE

(71) Applicant: Integrated Silicon Solution, Inc., Milpitas, CA (US)

(72) Inventor: Seong Jun Jang, San Jose, CA (US)

(73) Assignee: Integrated Silicon Solution, Inc., Milpitas, CA (US)

( * ) Notice: Subject to any disclaimer, the term of this patent is extended or adjusted under 35 U.S.C. 154(b) by 21 days.

(21) Appl. No.: 15/484,986

(22) Filed: Apr. 11, 2017

(65) Prior Publication Data

US 2018/0293181 A1 Oct. 11, 2018

(51) Int. Cl.
*G06F 12/00* (2006.01)
*G06F 12/14* (2006.01)
*G06F 21/79* (2013.01)

(52) U.S. Cl.
CPC ...... *G06F 12/1416* (2013.01); *G06F 12/1408* (2013.01); *G06F 12/1433* (2013.01); *G06F 21/79* (2013.01); *G06F 2212/1052* (2013.01)

(58) Field of Classification Search
None
See application file for complete search history.

(56) References Cited

U.S. PATENT DOCUMENTS

| 5,010,331 | A | * | 4/1991 | Dias | G04F 1/005 340/5.28 |
| 5,469,564 | A | * | 11/1995 | Junya | G06F 12/121 711/164 |
| 5,745,498 | A | * | 4/1998 | Adams | G01R 31/318527 714/718 |
| 2002/0141238 | A1 | * | 10/2002 | Pasternak | G11C 5/14 365/185.11 |
| 2004/0078511 | A1 | * | 4/2004 | Vogt | G06F 12/1466 711/103 |
| 2012/0306048 | A1 | * | 12/2012 | Li | G11C 17/16 257/529 |

* cited by examiner

*Primary Examiner* — David Yi
*Assistant Examiner* — Craig S Goldschmidt
(74) *Attorney, Agent, or Firm* — Innovation Counsel LLP

(57) ABSTRACT

A memory device incorporates a chip enable protection circuit implementing a secured chip enable method providing a passcode protected enable scheme with secure chip disable for the memory device. The passcode can be programmed at manufacturing or programmed by the user. Memory device access is enabled by receiving the correct passcode and memory device access is denied when the wrong passcode is entered. Furthermore, the secured chip enable method implements secure chip disable where the memory device is disabled in response to receiving wrong passcodes repeatedly for a maximum number of tries.

17 Claims, 10 Drawing Sheets

SECURED CHIP ENABLE WITH CHIP DISABLE

BACKGROUND OF THE INVENTION

Electronic devices, such as smart phones, portable computers and other consumer electronic devices, are often constructed using a processor device in communication with a memory device. The memory device may be a DRAM, SRAM, or a Flash memory device. Electronic devices need robust protection from security attacks. Hacking of the processing system can lead to breaching of the sensitive data stored on the memory devices. Conventional protection methods are often inadequate as the system may be breached by hacking attempts using hundreds or thousands of access cycles. Furthermore, in applications such as computer servers or smart phones, a strong security system to protect the devices in the event of theft is desired.

BRIEF DESCRIPTION OF THE DRAWINGS

Various embodiments of the invention are disclosed in the following detailed description and the accompanying drawings.

FIGS. 11(a) and 11(b), is a timing diagram illustrating the operation of the ripple counter of FIG. 10 in some examples.

DETAILED DESCRIPTION

Figure 1:
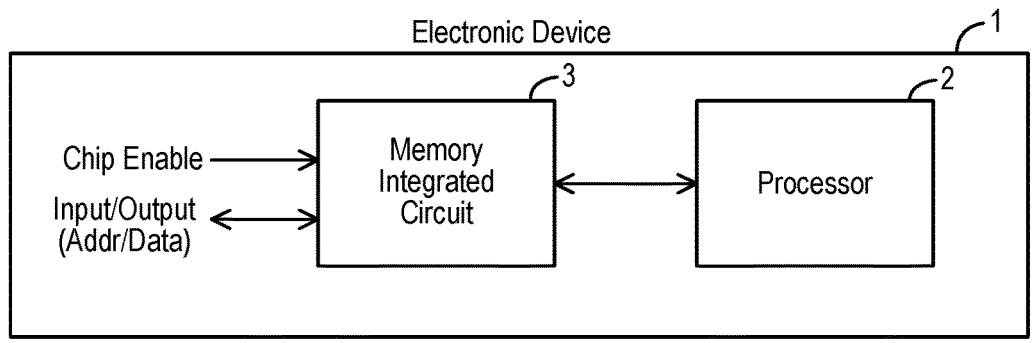
FIG. 1 illustrates the configuration of a conventional electronic device.

The invention can be implemented in numerous ways, including as a process; an apparatus; a system; and/or a composition of matter. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In embodiments of the present invention, a secured chip enable method for a memory device implements a passcode protected enable scheme with secure chip disable. The passcode can be programmed at manufacturing or programmed by the user. Memory device access is enabled by receiving the correct passcode and memory device access is denied when the wrong passcode is entered. Furthermore, the secured chip enable method implements secure chip disable where the memory device is disabled in response to receiving wrong passcodes repeatedly for a maximum number of tries. In some embodiments, a memory device incorporates a chip enable protection circuit to implement the secured chip enable method to protect the memory device from unwanted access. In particular, the memory device can be accessed only when the correct passcode is entered and the memory device is disabled after a maximum number of attempts has been made to access the memory using wrong passcodes. In this manner, data stored on the memory device is protected from unwanted access.

The secured chip enable method and the chip enable protection circuit of the present invention provide particular advantages when implemented in electronic applications such as a computer or a smart phone. In the event the device is stolen, the secured chip enable method ensures that the memory device in the electronic device cannot be accessed by a hacking attack using a large number of repeated passcode access attempts to try different combinations of passcodes. When the maximum allowable access attempts is reached, the memory device in the electronic system is disabled. The data stored thereon is thus protected from unwanted access. In some embodiments, the memory chip in the electronic device is disabled permanently and the electronic system becomes inoperative until and unless the disabled memory chip is replaced with another memory chip. In the case the memory device is an embedded memory, the host integrated circuit, such as a FPGA needs to be replaced for the electronic device to be functioning again. The sensitive data stored on the disable memory chip is thus protected and cannot be accessed by unauthorized parties.

In the present description, an electronic device refers to an electronic system constructed using, among other things, a processor device in communication with a memory device. The processor may be a hardware processor, a microprocessor, a micro-controller, a FPGA (Field Programmable Gate Array) or other processor device. The memory device may be a DRAM, SRAM, or a Flash memory device. Furthermore, the memory device may be a standalone or discrete memory device, also referred to as a memory integrated circuit or a memory chip. Alternately, the memory device may be an embedded memory in a host integrated circuit, such as an embedded memory in the processor, such as an embedded memory in a FPGA, a central processing unit or a solid state drive system. In the present description, a "memory device" refers to either a discrete memory integrated circuit ("memory chip") or an embedded memory in a host integrated circuit, which can be a general purpose or special purpose integrated circuit.

In general, a memory device includes address input terminals receiving memory addresses and commands (Read/Write), data input-output terminals receiving and outputting memory data, and a chip enable input terminal receiving a Chip Enable (CE) signal. The Chip Enable signal enables the memory circuitry of the memory device. The memory device does not function when the Chip Enable signal is deasserted and the memory device operates normally when the Chip Enable signal is asserted. In the present description, the memory device, whether a discrete memory chip or an embedded memory, is described as being controlled by the Chip Enable signal to enable (activate) or disable (deactivate) the memory circuitry of the memory device. The chip enable signal may be an active high signal (CE) or an active low signal (/CE).

In the conventional electronic devices, the memory device is activated or enabled in response to the Chip Enable signal being asserted. Upon power up of the electronic device, the processor or other control circuit in the electronic device issues the Chip Enable signal to the memory device to enable or activate the memory circuitry. Conventional electronic devices and conventional memory devices do not incorporate any security function for the memory device and therefore cannot prevent unauthorized access to the memory device. In the event of theft of the electronic device, the electronic device may be hacked and the data stored on the memory device may be breached. For example, even when the electronic device is protected with a passcode, access to the memory device may be accomplished by repeatedly powering on and off the electronic device while attempting different passcodes. The process can be repeated for a large number of times until the correct passcode is found and the memory device is therefore breached.

In embodiments of the present invention, a secured chip enable method and a chip enable protection circuit is implemented to provide security protection for a memory device in an electronic device. Access to the memory device is protected by a passcode and the memory device is permanently disabled after a maximum allowable passcode attempts has been made. In this manner, the memory device is protected from unwanted access and the security of the data stored on the memory is ensured. In the present description, "permanently disabling" the memory device means that the memory device is deactivated and cannot be activated by power cycling of the memory device or the electronic device housing the memory device. In most cases, the electronic device also becomes inoperative. The memory chip or, in the case of an embedded memory, the entire host integrated circuit will need to be replaced to render the electronic device operational again.

FIG. 1 illustrates the configuration of a conventional electronic device. Referring to FIG. 1, an electronic device 1, which may be a smart phone or a computer, includes a processor 2 in communication with a memory device 3. In this example, the memory device 3 is a discrete memory integrated circuit or a memory chip. In other examples, the memory integrated circuit 3 may be an embedded memory in a host integrated circuit, which may be an FPGA or other devices. The memory device 3 operates in response to input signals providing memory addresses and data and generates output data such as memory read data. The memory device 3 is activated by a Chip Enable (CE) signal which is provided by the circuitry of the electronic device. In some cases, the processor 2 may generate the Chip Enable signal.

Figure 2:
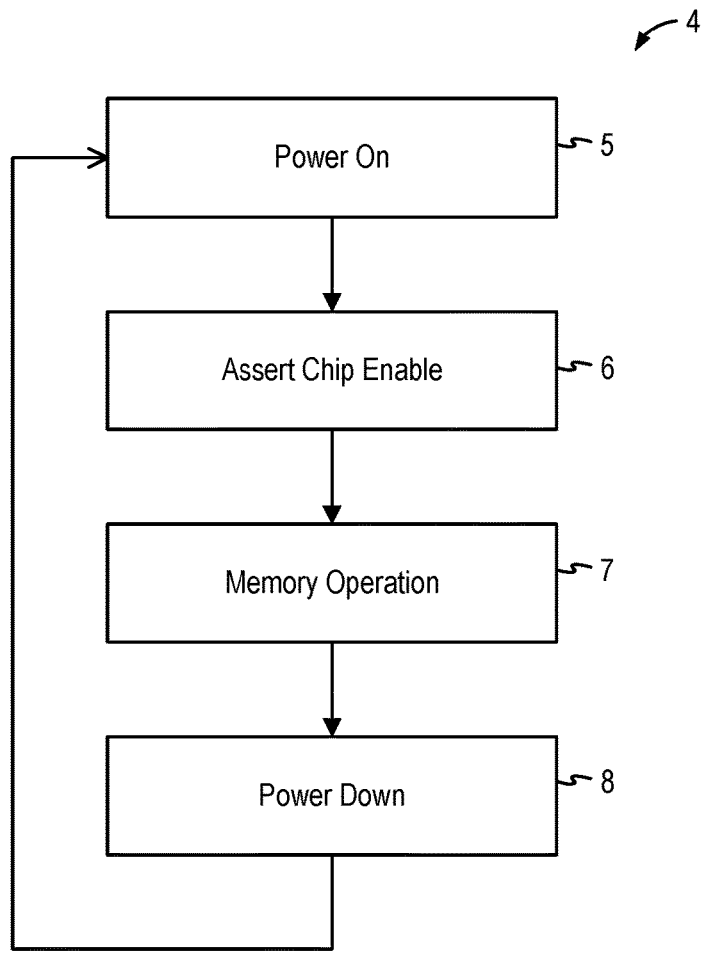
FIG. 2 is a flow chart illustrating the typical memory operation in the conventional electronic device of FIG. 1.

FIG. 2 is a flow chart illustrating the typical memory operation in the conventional electronic device of FIG. 1. Referring to FIG. 2, upon power up of the electronic device 1 or the memory device 3 (5), the Chip Enable signal for the memory device is asserted (6). With the Chip Enable asserted, the memory can assume normal operation and communicates with the processor (7). The operation continues until the electronic device is powered down (8). The conventional memory device does not include any security feature. The memory device is susceptible to unauthorized access as long as hacking attempts can access the Chip Enable signal and the memory input/output signals.

Figure 3:
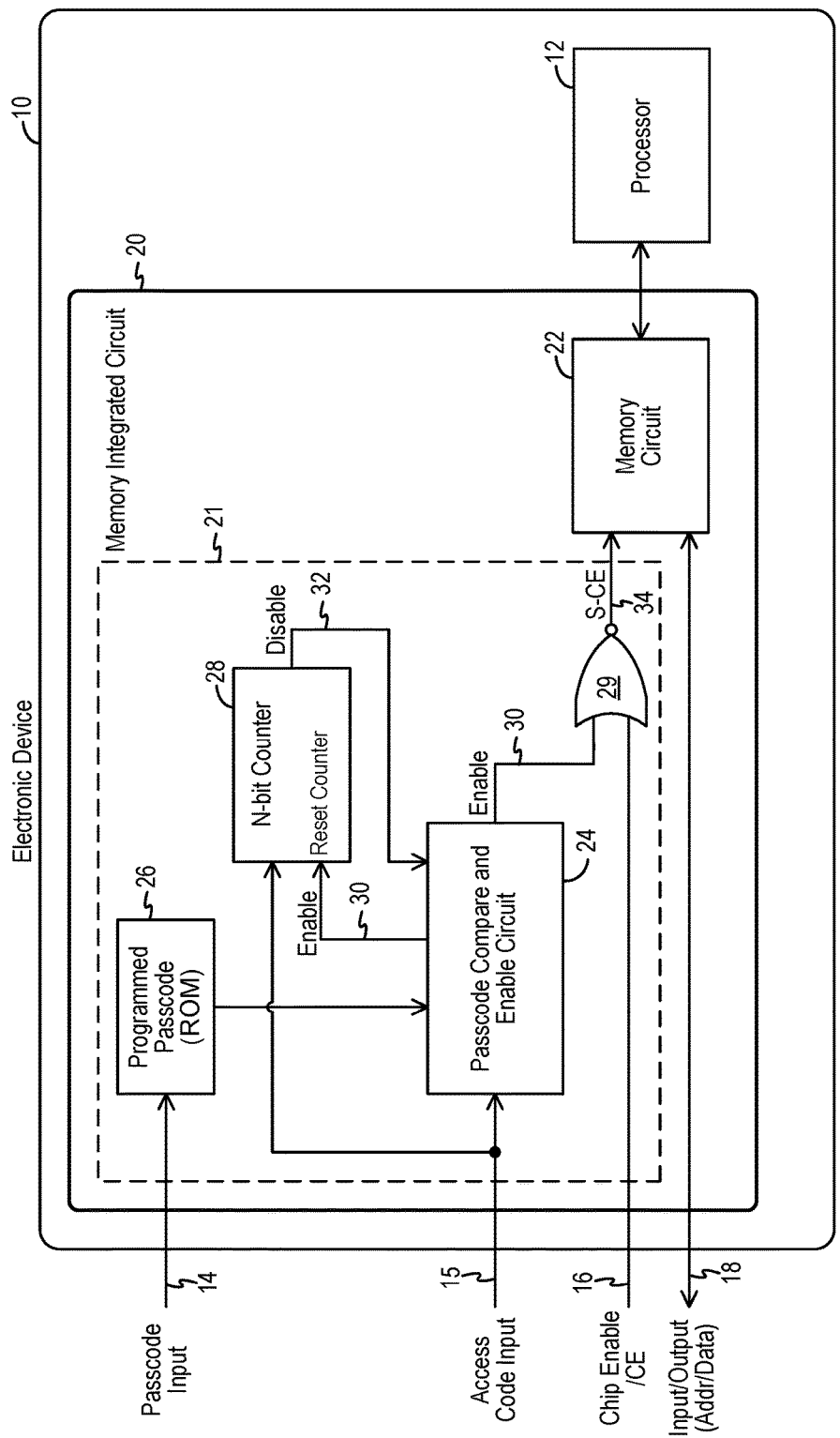
FIG. 3 is a block diagram of an electronic device constructed using a memory device incorporating the chip enable protection circuit in embodiments of the present invention.

In embodiments of the present invention, a memory device incorporates a chip enable protection circuit to implement the secured chip enable method to provide access security to the memory device. FIG. 3 is a block diagram of an electronic device constructed using a memory device incorporating the chip enable protection circuit in embodiments of the present invention. Referring to FIG. 3, an electronic device 10, which may be a smart phone or a computer, includes a processor 12 in communication with a memory device 20. In this present embodiment, the memory device 20 is a discrete memory integrated circuit or a memory chip. In other embodiments, the memory integrated circuit 20 may be an embedded memory in a host integrated circuit, which may be an FPGA or other integrated circuits. The memory device 20 operates in response to input signals providing memory addresses, commands, and write data and generates output signals providing read data. In the present illustration, the address input and data input/output signals are provided on an input/output data bus 18. In the present embodiment, the memory device 20 includes a memory circuit 22 containing the memory cells, address decoders, command control circuit, and read and write circuits.

The memory device 20 is activated by a Chip Enable (CE) signal (node 16) which is provided by the circuitry of the electronic device. In some cases, the processor 12 may generate the Chip Enable signal. In other cases, other control circuitry in the electronic device 10 may generate the Chip Enable signal. In the present embodiment, the memory device 20 responds to a Chip Enable signal that is an active low signal (/CE). That is, the Chip Enable signal is asserted to a logical low level to activate the memory device and is deasserted to a logical high level to deactivate the memory device. In the present embodiment, the memory device 20 includes a chip enable protection circuit 21 integrated therein to implement passcode protection so that irrespective of the state of the Chip Enable signal, the memory device is not activated unless the correct passcode is entered within a maximum allowable number of tries. In some embodiments, the memory circuit 22 is enabled or disabled in response to the chip enable protection circuit so that the memory data stored in the memory cells of the memory circuit are protected from unauthorized access.

In the present embodiment, the chip enable protection circuit 21 includes a storage element 26 for storing a programmed passcode. In the present embodiment, the storage element 26 is a read-only memory (ROM) storing a k-bit passcode. In other embodiments, the storage element 26 may be a set of preset fuse elements, a one-time programmable (OTP) device, a Flash memory, an eFuse or a metal fuse. The storage element 26 may receive the programmed passcode on a passcode input node 14. The programmed passcode can be stored into the storage element 26 during manufacturing. In that case, the programmed passcode is set by the manufacturer of the memory device. Alternately, a desired passcode can be selected by the user of the electronic device 10 and programmed into the storage element 26. Once programmed, the k-bit passcode stored in the storage element 26 cannot be changed.

The chip enable protection circuit 21 further includes a passcode compare and enable circuit 24 ("compare circuit 24") for receiving an access code to enable the memory device 20 and a counter 28 for counting the number of access code attempts. The compare circuit 24 receives a k-bit access code provided on an access code input node 15. In the present embodiment, the passcode input (node 14) and the access code input (node 15) are illustrated as being provided on different input terminals. In other embodiments, the two input codes can share the same input data bus. Alternately, the passcode input and the access code input can share the data bus (such as data bus 18) of the memory device so that no additional data pins are required to implement the protection function. In some embodiments, the firmware of the processor in the electronic device 10 is configured to expect an access code input upon power up of the electronic device.

The compare circuit 24 is in communication with the storage element 26 to receive the programmed passcode. The compare circuit 24 compares the received access code to the programmed passcode and generates an Enable signal (node 30) in response to the access code matching or not matching the programmed passcode. In response to the access code matching the programmed passcode, the enable latch circuit 24 generates the Enable signal having an asserted state. In the present embodiment, the Enable signal is an active low signal and thus the Enable signal is asserted to a logical low state in response to a matching passcode being received. Alternately, in response to the access code not matching the programmed passcode, the enable latch circuit 24 generates the Enable signal having a deasserted state (e.g. logical high state).

The Enable signal (node 30) and the Chip Enable signal (/CE) are coupled to a logical NOR gate 29 to generate the secured chip enable signal S-CE (node 34). The secured chip enable signal S-CE is the chip enable signal used to activate the memory circuit 22 of the memory device. Accordingly, the memory circuit 22 is activated only when both the Chip Enable signal (/CE) and the Enable signal are asserted (logical low). In other words, the memory circuit 22 is activated only when the Chip Enable signal is asserted by the electronic device and the correct passcode has been provided. In the present embodiment, a logical NOR gate 29 is used because both the Chip Enable signal and the Enable signal are logical low signals. In other embodiments, other logic circuit can be used in place of NOR gate 29 as a function of whether the Enable signal and the Chip Enable signal are active high or active low signals. Furthermore, in the present embodiment, the secured chip enable signal S-CE is an active high signal. In other embodiments, the secured chip enable signal S-CE may be configured as an active low signal.

The chip enable protection circuit 21 includes the counter 28 to keep track of the number of passcode attempts. In the present embodiment, counter 28 is an N-bit counter. The counter 28 detects for access code input transitions and counts each time an access code transition is detected. The counter 28 is reset when the Enable signal (node 30) is asserted to indicate that a correct passcode has been received. Thus, each time a correct passcode is received, the counter 28 resets its count to zero. However, when the wrong passcode is entered, the counter 28 will keep counting for each access code transition. The counter 28 has a maximum count threshold (e.g. 8 or 16) and when the maximum count threshold is met, the counter 28 asserts the Disable signal (node 32). The Disable signal is provided to the compare circuit 24 and operates to latch the Enable signal in a deasserted state. That is, the Disable signal is used to permanently disable the Enable signal. The deasserted state of the Enable signal is latched by the compare circuit 24 so that it would be impossible to reset the Enable signal even after power cycling.

It is instructive to note that the counter 28 has an initial count value, such as 0, set at end of the manufacturing process, such as during final test stage. The counter 28 is not reset again until the Enable signal is asserted. That is, the count value of the counter 28 does not get reset by power cycling of the memory device or the electronic device. Therefore, the maximum allowable passcode attempt is enforced and cannot be circumvented by power cycling of the memory device or the electronic device.

Figure 4:
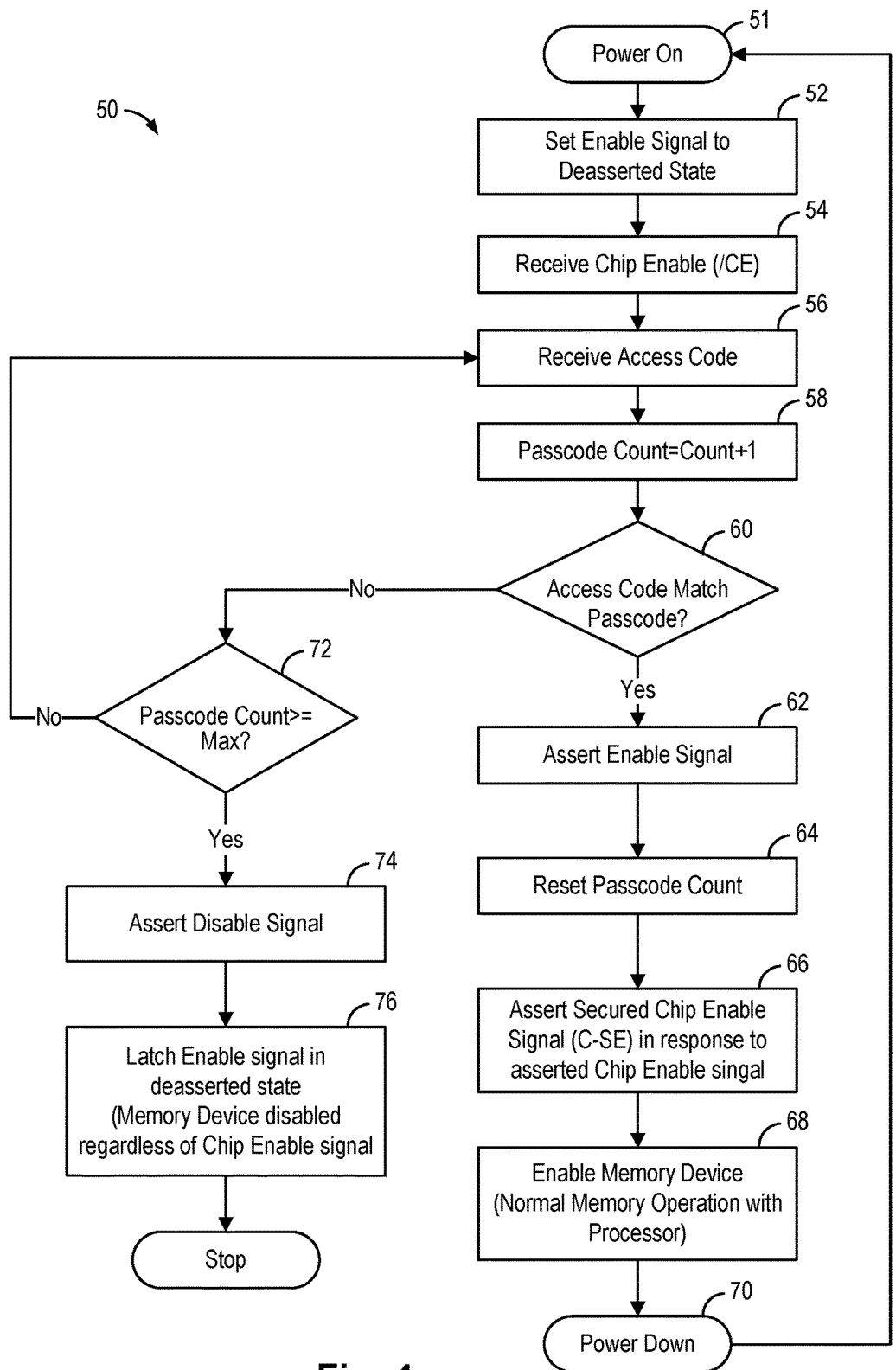
FIG. 4 is a flowchart illustrating a secured chip enable method in embodiments of the present invention.

FIG. 4 is a flowchart illustrating a secured chip enable method in embodiments of the present invention. In some embodiments, the method is implemented in an electronic device incorporating a memory device in communication with a processor. Referring to FIG. 4, a secured chip enable method 50 starts when the electronic device is powered on (51). The method 50 first sets an Enable signal to a deasserted state (52). The method 50 receives a Chip Enable signal for the memory device which can be an active-low chip enable signal /CE (54). The electronic device is also configured to expect an access code input for accessing the memory device. To that end, the method 50 receives an access code input (56). The order of receiving the Chip Enable signal and the Access Code is not critical. The method 50 keeps track of each access code attempt using a passcode count. Thus, as each access code input is received (56), the method 50 increments the passcode count by one (58).

The method 50 continues with determining if the access code entered matches the passcode previously stored (60). In the event that the access code entered matches the prestored passcode, the method 50 asserts the Enable signal (62). In some embodiments, when the Chip Enable signal is an active-low signal (/CE), the Enable signal is also an active low signal. In response to the Enable signal being asserted, the method 50 resets the passcode count (64). In some embodiments, the passcode count is reset to 0.

The method 50 then asserts the secured chip enable signal (S-CE) in response to the Chip Enable signal being asserted (66). In the event that the Chip Enable signal is not yet asserted, the secured chip enable signal will also not be asserted but will the Enable signal will remain in the asserted state pending the Chip Enable signal to be asserted. In the present description, the method 50 is described as receiving the Chip Enable signal (54) and then the access code (56). The exact order of receiving the Chip Enable signal and the access code is not critical to the practice of the present invention. In practice, the method 50 expects the access code input upon power up but the Chip Enable signal may be asserted any time after power up, including before or after the access code input attempts.

With the Chip Enable signal and the Enable signal asserted, the memory device is enabled or activated (68). Accordingly, the electronic device can proceed with normal memory operation with the processor. The normal memory operation proceeds until the electronic device is powered down (70).

In the case that the access code entered does not match the prestored passcode, the method 50 checks to see if the maximum allowable passcode attempts (maximum count threshold) have been met (72). If the passcode count is still less than or equal to the maximum allowable passcode attempts, the method 50 will return to receive another access code input (56). In the event that the passcode count exceeds the maximum allowable passcode attempts, the method 50 asserts the Disable signal (74). In response to the Disable signal being asserted, the method 50 then latches the Enable signal to a deasserted state (76). The deasserted state of the Enable signal is latched and maintained even if the electronic device is power cycled, that is, powered on and off. With the Enable signal latched to a deasserted state, the memory device is disabled regardless of the logical state of the Chip Enable signal provided to the memory device. The memory chip or the host integrated circuit with the embedded memory device would have to be replaced in order for the electronic device to operate again.

Figure 5:
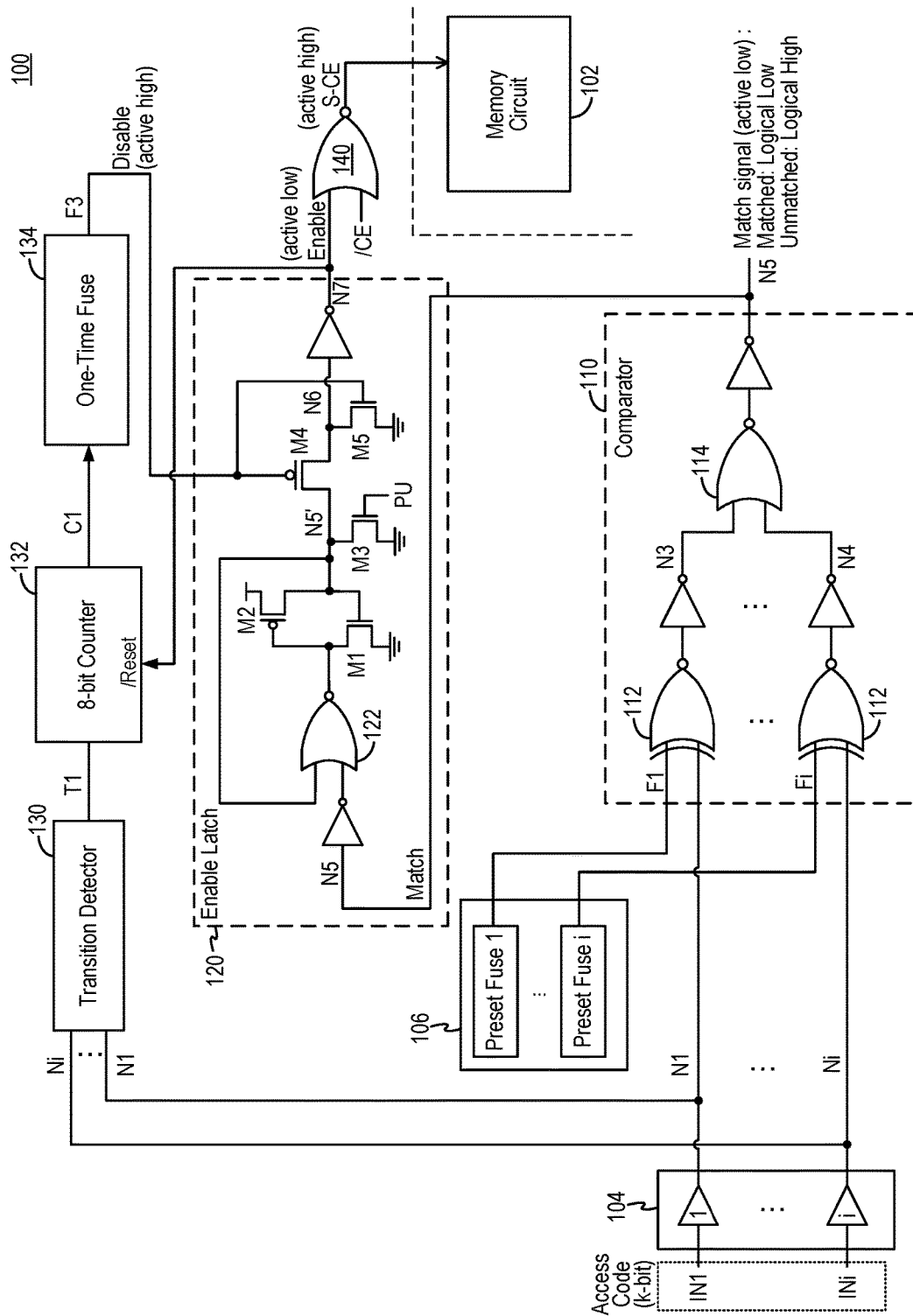
FIG. 5 is a schematic diagram of a chip enable protection circuit which can be integrated into a memory device in embodiments of the present invention.

FIG. 5 is a schematic diagram of a chip enable protection circuit which can be integrated into a memory device in embodiments of the present invention. Referring to FIG. 5, a chip enable protection circuit 100 receives an access code and the Chip Enable signal provided by control circuitry of the electronic device to enable the memory device. The chip enable protection circuit 100 generates a secured chip enable signal S-CE to enable or activate the memory circuit 102 of the memory device. In the present embodiment, the chip enable protection circuit 100 is integrated into the memory device and is thus formed in the same integrated circuit as the memory circuit 102.

The chip enable protection circuit 100 includes an input buffer 104 for receiving a k-bit access code IN1 to INi. The buffered access code N1 to Ni are then coupled to a comparator 110. The comparator 110 also receives the k-bit prestored passcode F1 to Fi from a storage element 106. For example, the storage element 106 can be constructed using preset fuses and including preset fuses 1 to i. The preset fuses in the storage element 106 have been programmed previously to store a given passcode which cannot be changed. Each bit of the access code Ni is compared against the corresponding bit of the passcode Fi using a logical XNOR gate 112. The XNOR gate 112 generates a logical high output when the two inputs are the same and generates a logical low output when the two inputs are different. The outputs from all of the XNOR gates 112 are each inverted by inverters and then combined at an NOR logical gate 114. More specifically, each input signal to the NOR gate 114 represents the bit comparison result of each bit of the access code to the passcode. For example, the input signal N3 represents the bit comparison result of bit N1 of the access code and input signal N4 represents the bit comparison result of bit Ni of the access code. Each input signal to the NOR gate 114 has a logical low state when the access code and the passcode bits are the same and have a logical high state when the access code and the passcode bits are different. The output of the NOR logical gate 114 is indicative of the comparison result of all of the bits of the access code. The output of the NOR logical gate 114 is further inverted to generate a comparator output signal N5 being the Match signal.

It is instructive to note that the construction of the comparator 110 in FIG. 5 is illustrative only and other combination of logic gates can be used. For example, the bit comparison results (e.g. N3, N4) and the comparator output signal N5 can be active high signals or active low signals. In the present configuration, the bit comparison result (e.g. N3, N4) is an active low signal—that is, the bit comparison result has a logical low state when the access code bit matches the corresponding passcode bit. The bit comparison results are combined by NOR gate 114 and then inverted. As thus configured, the comparator output signal N5 which is the Match signal is an active low signal. That is, the N5/Match signal has a logical low state when the access code bit matches the corresponding passcode bit. The N5/Match signal has a logical high state when any bit of the access code does not match the corresponding passcode bit.

As the access code is being compared at the comparator 110, the access code is also provided to a transition detector 130. The transition detector 130 detects for a signal transition on any bits of the access code N1 to Ni and generates an output signal T1 in response to a transition being detected. The signal T1 is coupled to drive a counter 132. In the present embodiment, the counter 132 is an 8-bit counter and has the count value reset during manufacturing, such as during the final test stage. After that, the counter 132 is only reset by the Reset terminal receiving a Reset signal. In the present embodiment, the Reset terminal is an active low terminal (/Reset) and thus, the counter is reset by a logical low signal level at the Reset terminal. The count value of counter 132 is preserved even if the memory device is power cycled. Each time signal T1 is asserted or triggered, the counter 132 is incremented. In the present embodiment, the counter 132 receives the Enable signal (N7) as the Reset signal where the Enable signal is an active low signal. Therefore, when the Enable signal is asserted in response to the access code matching the passcode, the reset terminal at counter 132 is asserted and the counter 132 is reset and the count value returns to 0. Meanwhile, the counter 132 is programmed with a maximum count value or maximum count threshold. In the event that the counter 132 exceeds the maximum count value, the counter 132 asserts the counter output signal C1.

The counter output signal C1 is coupled to drive a one-time fuse 134 which generates the Disable signal (F3). The one-time fuse 134 is normally closed and is changed or programmed to an open circuit in response to the counter output signal C1 being asserted. Accordingly, the Disable signal (F3) is deasserted normally and is asserted when the counter output signal C1 is asserted, indicating the maximum allowable passcode attempts has been reached or exceeded. In the present embodiment, the Disable signal is an active high signal. Therefore, the Disable signal has a logical low value when the one-time fuse is normally closed and has a logical high value when the one-time fuse becomes an open circuit.

The chip enable protection circuit 100 further includes an enable latch circuit 120 which is driven by the Match signal (N5) and also the Disable signal (F3) from the one-time fuse 134. The enable latch circuit generates the Enable signal (N7) to enable or disable the memory circuit based on passcode security. The enable latch circuit 120 includes a feedback latch circuit formed by an NOR gate 122, an NMOS transistor M1 and a PMOS transistor M2. The enable latch circuit 120 includes an NMOS transistor M3 provided to reset the state of the feedback latch circuit. The NMOS transistor M3 is driven by a pull-up signal PU which is asserted after power on to reset the enable latch circuit 120. The enable latch circuit 120 further includes a disable gate circuit formed by a PMOS transistor M4 and an NMOS transistor M5, both driven by the Disable signal (F3). The output signal N6 of the disable gate circuit is inverse of the Match signal N5. The signal N6 is inverted to generate the signal N7 as the Enable signal.

The enable latch circuit 120 operates to latch and pass the Match signal (N5) through to the output node as the Enable signal (N7). Thus, both the Match signal (N5) and the Enable signal (N7) are active low signals. That is, both signals are asserted at a logical low state to indicate an access code match and to enable the memory circuit 102. However, the Match signal (N5) is gated by the disable gate circuit. When the one-time fuse 134 remains closed, that is, the maximum passcode attempts have not been reached, the Disable signal is deassserted (e.g. logical low). With the Disable signal deasserted, the PMOS transistor M4 is turned on while the NMOS transistor M5 is turned off. Thus, the Match signal N5' at the output of the feedback latch circuit is passed through PMOS transistor M4 to signal N6. The signal N6 is inverted to generate the signal N7 as the Enable signal. The enable signal N7 and the Chip Enable signal (/CE) are coupled to an NOR gate 140 to generate the secured Chip Enable (S-CE) signal as described above. That is, with both the Enable signal and the Chip Enable signal (/CE) being active low signals, the secured Chip Enable (S-CE) signal will only be asserted (active high) when both the Enable signal and the Chip Enable signal (/CE) are asserted to the logical low level. Once the Enable signal is asserted, the secured Chip Enable signal is solely controlled by the control circuitry or the processor of the electronic device. The chip enable protection circuit 100 becomes transparent to the memory-processor operation.

However, in the event that the one-time fuse 134 is programmed to an open circuit, that is, the maximum passcode attempts have been reached, the Disable signal is asserted (e.g. logical high). With the Disable signal asserted, the PMOS transistor M4 is turned off while the NMOS transistor M5 is turned on. Thus, the Match signal N5' at the output of the feedback latch circuit is blocked from passing through PMOS transistor M4 to signal N6. Instead, signal N6 is grounded by NMOS transistor M5 and is thus stuck at a logical low level. With the signal N6 grounded, the Enable signal (N7) is driven to and stuck at a logical high level. With the Enable signal (N7) stuck at a logical high level, the secured chip enable signal (S-CE) is deasserted regardless of the logical state of the Chip Enable signal (/CE) provided by the control circuitry of the electronic device. In this manner, the memory circuit 102 is disabled permanently because the correct passcode has not been entered after the maximum number of allowed tries.

In particular, once the one-time fuse 134 is programmed to an open circuit, the state of the one-time fuse cannot be reversed. Thus, once the Disable signal is asserted, the state of the Disable signal cannot be reversed. Thus, the disable gate circuit of PMOS transistor M4 and NMOS transistor M5 will be driven so that the signal N6 is stuck at ground. There will be no way to reverse the signal N6 even if the correct access code is subsequently entered or even if the memory device have been power cycled. The signal N6 is still stuck at ground because the one-time fuse has been blown or programmed to an open circuit. The only means to recover the electronic device after the maximum allowable passcode attempts is to replace the memory device itself.

In embodiments of the present invention, the one-time fuse 134 can be implemented using a metal fuse or an eFuse (electronic fuse). For example, a metal fuse has a normally closed circuit and becomes open circuit when programmed while an eFuse has a resistance that can be changed to represent the closed circuit (low resistance) or open circuit (large resistance) as the programmed value.

Figure 12:
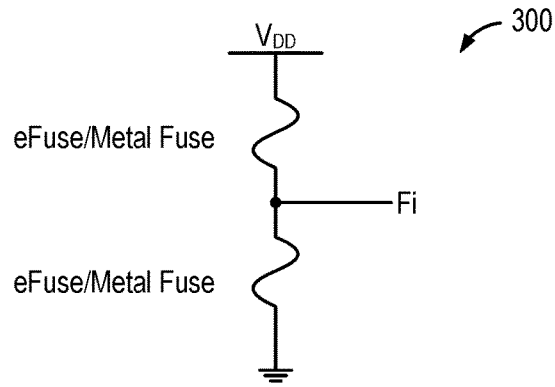
FIG. 12 is a circuit diagram illustrating a preset fuse in some examples.

FIG. 12 is a circuit diagram illustrating a preset fuse in some examples. Referring to FIG. 12, a preset fuse 300 can be formed by using two fuses connected in series between the positive power supply voltage Vdd and ground. The common node between the two fuses being the output node Fi of the preset fuse 300. Each of the two serially connected fuses can be a metal fuse or an eFuse. A metal fuse is normally closed or short circuit and is blown open when programmed. In preset fuse 300, one of the fuses will be blown to set the programmed value. When the top fuse is blown, the programmed value is set to ground or logical low. When the bottom fuse is blown, the programmed value is set to Vdd or logical high. An eFuse has its resistance value changed to represent the closed circuit or open circuit condition. The eFuse may have a normally low resistance (closed circuit) and becomes a high resistance (open circuit) when programmed. Accordingly, the eFuse can be programmed to set the preset fuse 300 to the desired logical low or logical high state. In the chip enable protection circuit described above, a set of preset fuses 300 is used to store the passcode by programming each preset fuse to the desired logical state.

Figure 13:
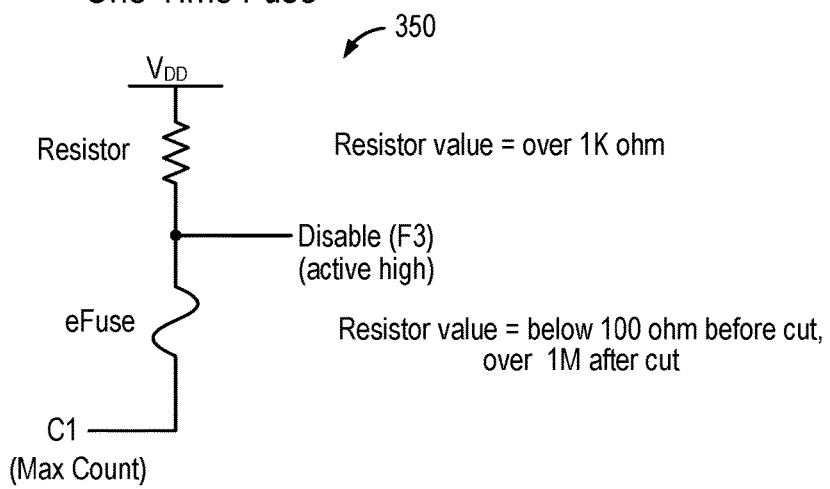
FIG. 13 is a circuit diagram illustrating a one-time fuse in some examples.

FIG. 13 is a circuit diagram illustrating a one-time fuse in some examples. Referring to FIG. 13, a one-time fuse 350 can be formed by using a resistor connected in series with a fuse between the positive power supply voltage Vdd and the control signal C1. In the present example, the control signal C1 is the counter output signal indicating the maximum allowable passcode access has been made without supplying the correct passcode. The common node between the resistor and the fuse is the fuse output signal which is the Disable signal (F3) in the present example. The fuse can be implemented as a metal fuse or an eFuse. In the present embodiment, the resistor has a high resistance value of 1 kohm and the fuse is an eFuse having a normally low resistance value of 100 ohm. Therefore, before the one-time fuse 350 is programmed or blown, the fuse output signal is ground or a logical low state. In the event the signal C1 is asserted to program or blown the eFuse in the one-time fuse 350, the resistance value of the eFuse increases to 1 Mohm after the programming. With the change in the resistance of the eFuse, the eFuse now has a much larger resistance than the resistor. The one-time fuse 350 will thus be driven to the power supply voltage Vdd and the fuse output signal (F3) becomes logical high. The Disable signal is thus asserted.

Figure 6:
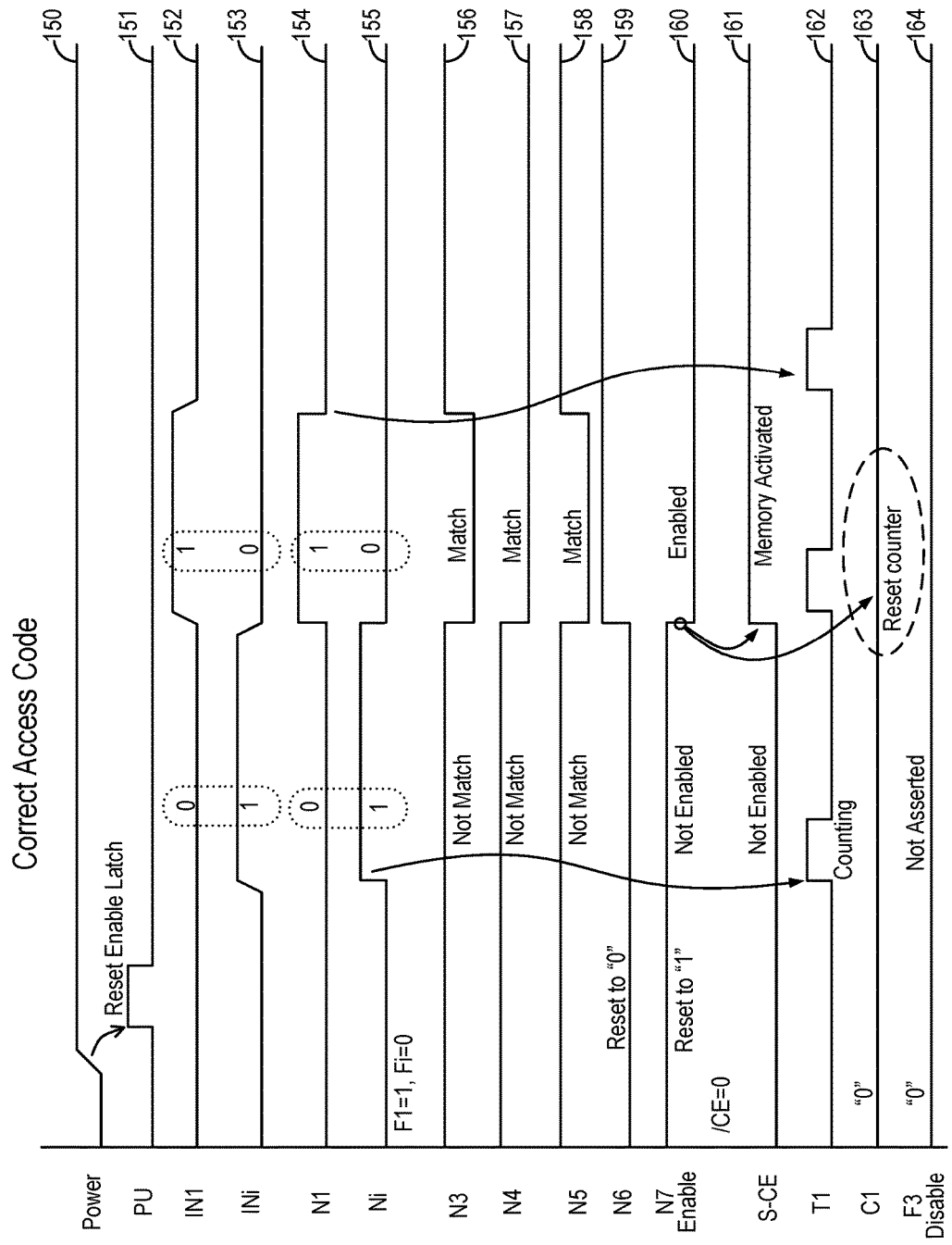
FIG. 6 is a timing diagram illustrating the operation of the chip enable protection circuit in the example when a correct access code is entered.

FIG. 6 is a timing diagram illustrating the operation of the chip enable protection circuit in the example when a correct access code is entered. Referring to FIG. 6, curves 150 to 164 are provided for the various signals in the chip enable protection circuit of FIG. 5. In the present example, it is assumed that the programmed passcode has a value of F1=1 and Fi=0. Furthermore, in the present example, the Chip Enable signal /CE is assumed to have been asserted (logical low). The Disable signal (curve 164) is initially set at a logical low state.

Upon power up (curve 150), the pull-up signal PU (curve 151) is asserted for a short duration to reset the enable latch circuit. With the enable latch circuit reset, signal N6 (curve 159) is reset to a logical low state indicating a non-match state and signal N7 (the Enable signal) (curve 160) is at a logical high state indicating not enabled. The chip enable protection circuit starts to receive access code input IN1 and INi (curves 153, 153) which are buffered as input access codes N1 and Ni (curves 154, 155). The first access code has a value of "01" which does not match the programmed passcode of "10". The bit comparison results N3 and N4 (curves 156, 157) are at a logical high state indicating not matched. The transition detector circuit detects the signal transition and asserts T1 (curves 162) to increment the counter.

Then, at the next access code input, the code "10" is entered. In this case, the entered access code matches the programmed code "10". The bit comparison results N3 and N4 changes to the logical low state indicating matched and the signal N6 transitions to a logical high. The Enable signal (N7) transitions to a logical low state to enable the memory circuit. With the Enable signal (N7) and the Chip Enable signal /CE both at logical low levels, the secured chip enable signal (S-CE) (curves 161) is asserted to activate the memory circuit. The Enable signal N7 (curve 160) is also coupled to the counter to reset the count value (curve 163). The chip enable protection circuit operates in this manner to activate the memory circuit in response to a correct passcode being provided.

Figure 7:
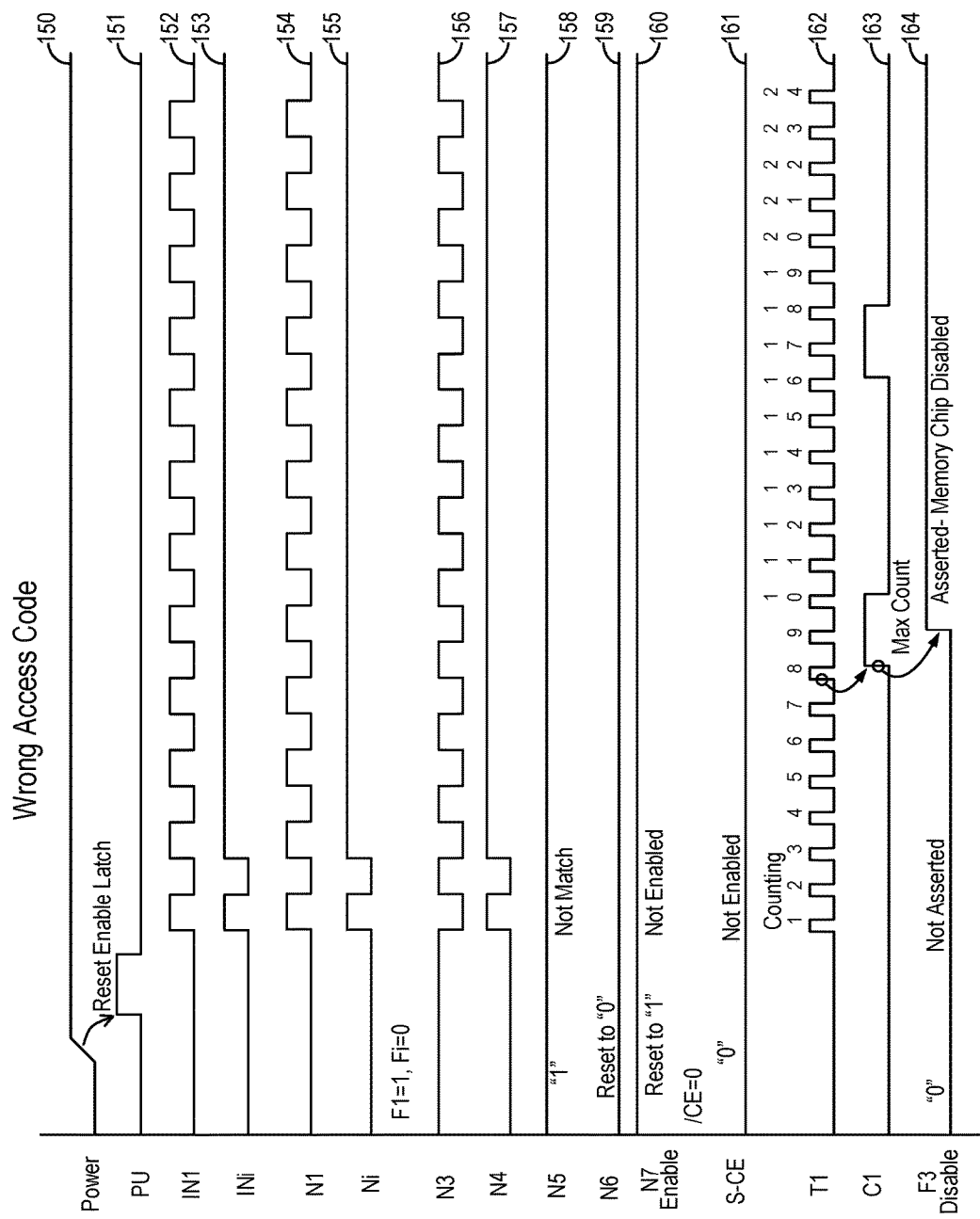
FIG. 7 is a timing diagram illustrating the operation of the chip enable protection circuit in the example when incorrect access codes are repeatedly entered.

FIG. 7 is a timing diagram illustrating the operation of the chip enable protection circuit in the example when incorrect access codes are repeatedly entered. Referring to FIG. 7, a series of access codes IN1 and INi are being entered (curves 152, 153) with each access code not matching the programmed passcode of F1=1 and Fi=0. The transition detector detects each code transition and triggers the signal T1 (curve 162) for each access code entry. The Match signal N5 (curve 158) remains deasserted at a logical high state (not matched) and the Enable signal N7 remains deasserted at a logical high state (not enabled). The secured chip enable S-CE signal (curve 161) is also deasserted at a logical low state (not enabled).

When the maximum allowable passcode attempts have been made, for example, 8 tries, the counter asserts the counter output signal C1 (curve 163). The counter output signal C1 blows the one-time fuse or program the one-time fuse to cause the Disable signal (curve 164) to be asserted (logical high). With the Disable signal thus asserted, signal N6 is stuck at the logical low state and the Enable signal N7 is stuck at a logical high state and the memory device cannot be activated, regardless of the logical state of the Chip Enable /CE signal.

Figure 8:
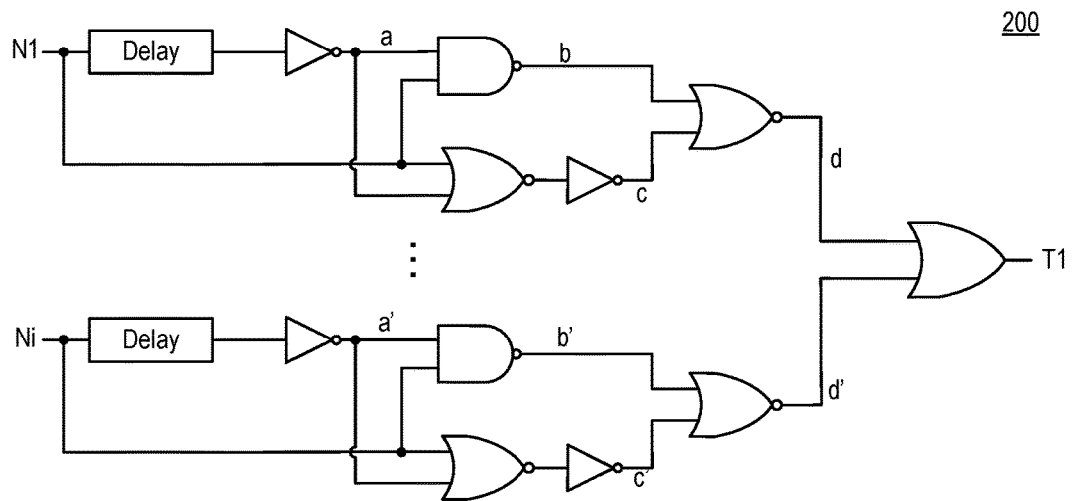
FIG. 8 is a circuit diagram illustrating a transition detector circuit in some examples.
Figure 9:
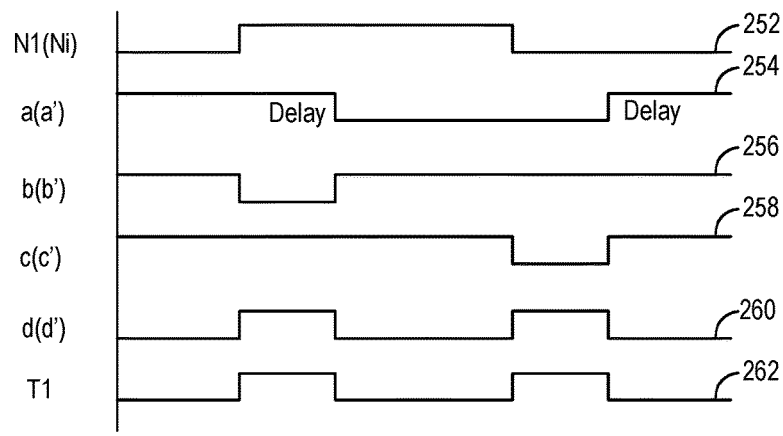
FIG. 9 is a timing diagram illustrating the operation of the transition detector circuit of FIG. 8 in some examples.

FIG. 8 is a circuit diagram illustrating a transition detector circuit in some examples. The transition detector circuit can be used to implement the transition detector circuit in the chip enable protection circuit in some embodiments. Referring to FIG. 8, the transition detector circuit 200 detects for signal transition (low-to-high or high-to-low) on each bit of the buffered access code input N1 to Ni and generates an output signal T1 in response to a signal transition being detected. FIG. 9 is a timing diagram illustrating the operation of the transition detector circuit of FIG. 8 in some examples. In brief, each bit of the access code input (e.g. N1) is delayed and the delayed and non-delayed signal is coupled to an NAND gate and an NOR gate. The outputs b and c of the NAND gate and NOR gate (inverted) are then combined at another NOR gate to generate the output d indicating the detected signal transition on the access code bit.

Figure 10:
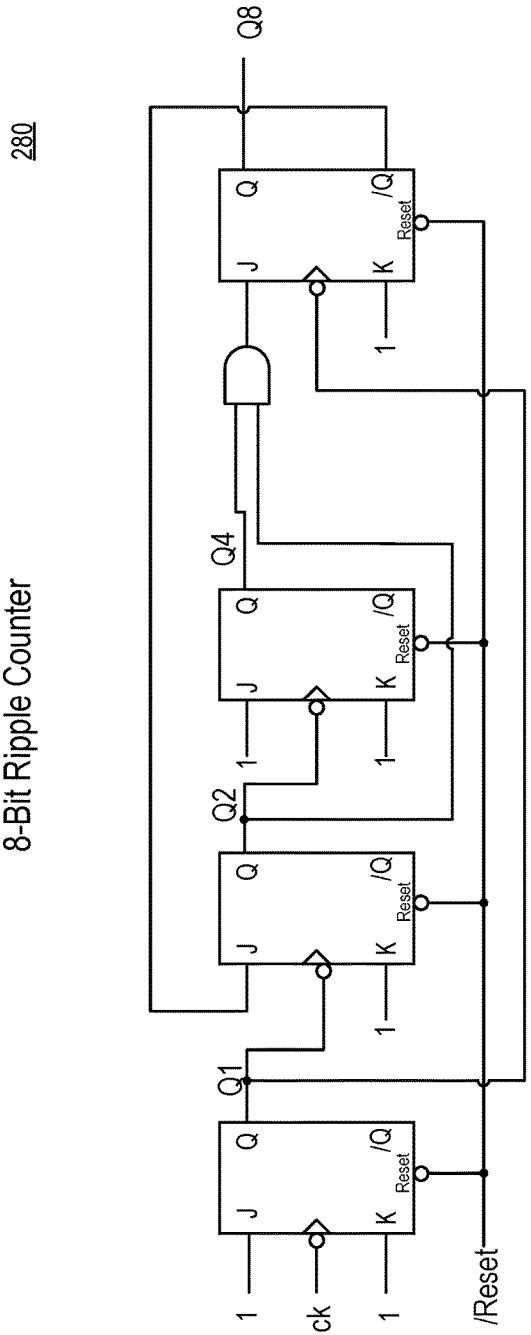
FIG. 10 is a circuit diagram illustrating an 8-bit ripple counter in some examples.
Figure 11:
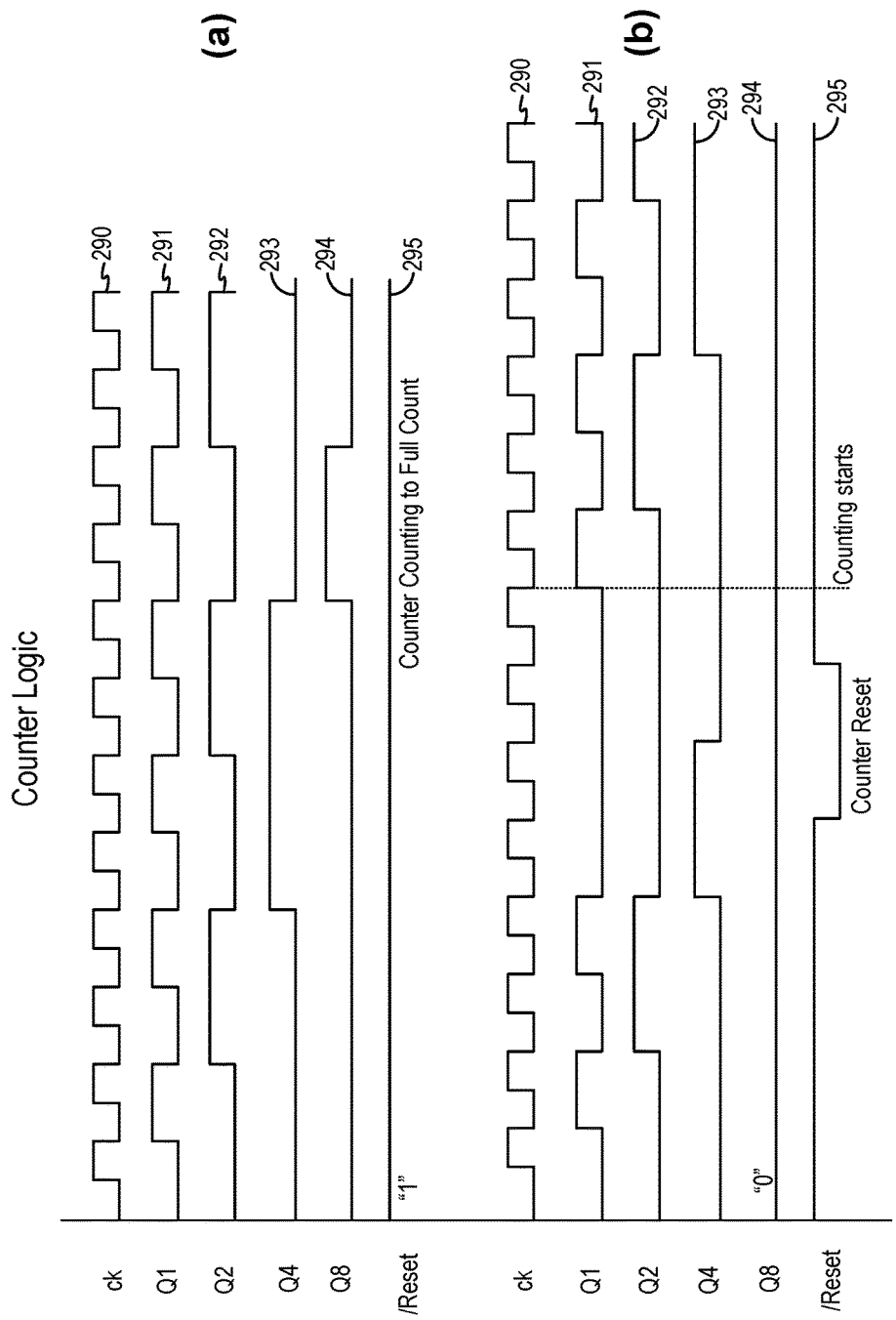
FIG. 11, which includes

FIG. 10 is a circuit diagram illustrating an 8-bit ripple counter in some examples. Referring to FIG. 10, the 8-bit ripple counter 280 can be used to implement the passcode counter in the chip enable protection circuit in some embodiments. FIG. 11, which includes FIGS. 11(a) and 11(b), is a timing diagram illustrating the operation of the ripple counter of FIG. 10 in some examples. More specifically, the operation of the ripple counter counting to a full count is shown in FIG. 11(a) and the operation of the ripple counter being reset before full count is shown in FIG. 11(b).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A memory device, comprising:
   a memory circuit comprising a plurality of memory cells, address decoders, command control circuit, read circuit and write circuit, the memory device being responsive to a chip enable signal to activate or deactivate the memory circuit; and
   a chip enable protection circuit configured to receive the chip enable signal and a k-bit input access code, the chip enable protection circuit comprising:
      a storage element storing a k-bit passcode;
      a compare circuit to compare the k-bit input access code to the k-bit passcode and to generate a compare result signal, the compare result signal being asserted in response to the k-bit input access code matching the k-bit passcode based on a bit-by-bit comparison;
      a transition detector to receive the k-bit input access code, to detect a signal transition on any bit of the k-bit input access code and to generate a transition detection output signal in response to a signal transition being detected;
      a counter to count the number of input access codes being received by incrementing a count value in response to the transition detection output signal generated by the transition detector, the counter having a maximum count threshold and receiving a reset signal to reset the count value, the counter generating a counter output signal, the counter output signal being asserted in response to the count value being equal to or greater than the maximum count threshold;
      a one-time fuse circuit to receive the counter output signal, the one-time fuse circuit being normally deasserted and being asserted in response to the counter output signal being asserted, wherein the asserted state of the one-time fuse cannot be reversed, the one-time fuse generating a disable signal, the disable signal being normally deasserted and being asserted in response to the one-time fuse circuit being in the asserted state;
      an enable latch circuit to receive the compare result signal and the disable signal, the enable latch circuit comprising a feedback latch circuit and a disable gate circuit, the feedback latch circuit receiving the compare result signal and latching the state of the compare result signal to provide the compare result signal as an enable signal in a signal path of the enable latch circuit, the disable gate circuit configured to pass or block the compare result signal on the signal path in response to the disable signal, the enable latch circuit generating the enable signal having an asserted state in response to the compare result signal being asserted and the disable signal being deasserted, the enable latch circuit generating the enable signal having a deasserted state in response to the compare result signal being deasserted or the disable signal being asserted;
      a first logical gate receiving the enable signal and the chip enable signal and generating a secured chip enable signal, the secured chip enable signal being asserted in response to the enable signal and the chip enable signal being asserted and the secured chip enable signal being deasserted in response to the enable signal or the chip enable signal being deasserted, the enable signal being provided to the counter as the reset signal, the secured chip enable signal being applied to activate or deactivate the memory circuit, wherein the secured chip enable signal is asserted to activate the memory circuit to operate in normal operation and the secured chip enable signal is deasserted to deactivate the memory circuit so that the memory circuit does not function, wherein the chip enable protection circuit sets the secured chip enable signal to a deasserted state upon power-up of the memory device; and in response to the input access code matching the passcode, the chip enable protection circuit asserts the secured chip enable signal to activate the memory circuit in response to the chip enable signal being asserted; and wherein in response to the input access code not matching the passcode, the chip enable protection circuit keeps the secured chip enable signal deasserted to deactivate the memory circuit regardless of a logical state of the chip enable signal; and the chip enable protection circuit latches the secured chip enable signal to the deasserted state in response to the number of input access code being received having exceeded the maximum count threshold, wherein in response to the secured chip enable signal being latched, the memory circuit is permanently disabled and cannot be activated to normal operation by power cycling of the memory circuit.

2. The memory device of claim 1, wherein each of the passcode and the input access code comprises the k-bit value and each bit of the input access code is compared to a corresponding bit of the passcode.

3. The memory device of claim 1, wherein the chip enable signal comprises an active low signal, the compare result signal comprises an active low signal and the first logical gate comprises a logical NOR gate.

4. The memory device of claim 1, wherein the one-time fuse comprises a resistor connected in series with a fuse between a first voltage and a ground voltage, the common node between the resistor and the fuse being the disable signal as the fuse output signal, the fuse being selected from one of a metal fuse and an eFuse.

5. The memory device of claim 4, wherein the fuse comprises a metal fuse being normally closed and being programmed to open circuit.

6. The memory device of claim 4, wherein the fuse comprises an eFuse being normally low resistance value and being programmed to a high resistance value.

7. The memory device of claim 1, wherein the one-time fuse asserts the disable signal to latch the secured chip enable signal in a deasserted state to deactivate the memory circuit regardless of the chip enable signal.

8. The memory device of claim 1, wherein the storage element being one of a metal fuse, an eFuse, a Flash memory, and a one-time programmable device.

9. The memory device of claim 1, wherein the memory device comprises a memory integrated circuit.

10. The memory device of claim 1, wherein the memory device comprises an embedded memory device in a host integrated circuit.

11. A method of operating a memory device, the memory device comprising a memory circuit including a plurality of memory cells, address decoders, command control circuit, read circuit and write circuit, the memory device being responsive to a chip enable signal to activate or deactivate the memory circuit, the method comprising:

setting an enable signal to a deasserted state upon powering up of the memory device;

receiving an input access code;

incrementing a count value for each input access code received;

comparing the input access code to a pre-programmed passcode stored in the memory device;

in response to the input access code matching the passcode, asserting a compare result signal;

in response to the count value being less than a maximum count threshold, generating a disable signal having a deasserted state;

in response to the count value being equal to or greater than the maximum count threshold, generating the disable signal having an asserted state, wherein the asserted state of the disable cannot be reversed;

latching the state of the compare result signal to provide as the enable signal in a signal path, the disable signal being configured to pass or block the compare result signal on the signal path;

in response to the disable signal being deasserted, generating the enable signal having an asserted state in response to the compare result signal being asserted;

in response to the disable signal being asserted, generating the enable signal having the deasserted state in response to the compare result signal being deasserted or the disable signal being asserted;

in response to the enable signal and the chip enable signal both being asserted, asserting a secured chip enable signal to activate the memory circuit, wherein the secured chip enable signal is asserted to activate the memory circuit to operate in normal memory operation;

in response to the input access code not matching the passcode, maintaining the enable signal in the deasserted state to keep the secured chip enable signal in a deasserted state to keep the memory circuit deactivated, wherein the secured chip enable signal is deasserted to deactivate the memory circuit so that the memory circuit does not function;

in response to the count value not exceeding a maximum count threshold, returning to receiving the next input access code;

in response to the count value having exceeded the maximum count threshold, latching the enable signal in the deasserted state using the disable signal, the memory circuit being deactivated to prevent access to any memory cell in the plurality of memory cells regardless of the logical stage of the chip enable signal, wherein in response to the secured chip enable signal being latched, the memory circuit is permanently disabled and cannot be activated to normal operation by power cycling of the memory circuit.

12. The method of claim 11, wherein comparing the input access code to a pre-programmed passcode stored in the memory device comprises:

providing the passcode and the input access code each in k bits; and comparing each bit of the k-bit input access code to the corresponding bit of the k-bit passcode.

13. The method of claim 11, wherein latching the enable signal in the deasserted state comprises:

providing a one-time fuse to generate the disable signal, the one-time fuse being normally closed to deassert the disable signal;
driving the one-time fuse using a first signal indicative of the count value;
in response to the count value not exceeding the maximum count threshold, maintaining the one-time fuse in the normally closed state;
in response to the count value having exceeded the maximum count threshold, programming the one-time fuse to an open circuit to assert the disable signal; and
latching the enable signal in the deasserted state in response to the disable signal being asserted.

14. The method of claim 13, wherein programming the one-time fuse to an open circuit comprises:
changing the one-time fuse from a closed circuit to an open circuit.

15. The method of claim 13, wherein programming the one-time fuse to an open circuit comprises:
changing a resistance value of the one-time fuse from a low resistance value to a high resistance value.

16. The method of claim 11, wherein the memory device comprises a memory integrated circuit.

17. The method of claim 11, wherein the memory device comprises an embedded memory device in a host integrated circuit.

* * * * *